(12) United States Patent
Jean et al.

(10) Patent No.: US 11,982,306 B2
(45) Date of Patent: May 14, 2024

(54) SECURITY-LOCKING DEVICE FOR WINCH KEYHOLE

(71) Applicant: Wen-Fong Jean, Taoyuan (TW)

(72) Inventors: Wen-Fong Jean, Taoyuan (TW); Da-Zen Jean, Taoyuan (TW); Tai-Lien Huang, Taoyuan (TW); Chen-Kuo Chen, Taoyuan (TW)

(73) Assignee: Wen-Fong Jean, Taoyuan (TW)

( * ) Notice: Subject to any disclaimer, the term of this patent is extended or adjusted under 35 U.S.C. 154(b) by 720 days.

(21) Appl. No.: 17/185,862

(22) Filed: Feb. 25, 2021

(65) Prior Publication Data
US 2021/0404506 A1   Dec. 30, 2021

(30) Foreign Application Priority Data

Jun. 24, 2020 (TW) .................................. 109121686

(51) Int. Cl.
| | |
|---|---|
| *F16B 39/04* | (2006.01) |
| *E05B 65/00* | (2006.01) |
| *F16B 21/00* | (2006.01) |
| *F16B 21/08* | (2006.01) |
| *F16B 41/00* | (2006.01) |

(52) U.S. Cl.
CPC ............... *F16B 39/04* (2013.01); *E05B 65/00* (2013.01); *F16B 21/00* (2013.01); *F16B 21/08* (2013.01); *F16B 21/086* (2013.01); *F16B 41/005* (2013.01)

(58) Field of Classification Search
CPC .......... F16B 39/04; F16B 21/00; F16B 21/08; F16B 21/086; F16B 41/005; F16B 21/125; E05B 65/00; Y10T 70/5854; Y10T 70/5858; Y10T 70/5863; Y10T 70/5867; B62H 5/001; B62H 5/003
USPC ................................................ 411/372.5, 347
See application file for complete search history.

(56) References Cited

U.S. PATENT DOCUMENTS

| | | | | | |
|---|---|---|---|---|---|
| 1,604,690 | A | * | 10/1926 | Halaby ................. | F16B 41/005 224/42.25 |
| 3,540,245 | A | * | 11/1970 | Pope ..................... | F16B 41/005 70/231 |
| 3,782,146 | A | * | 1/1974 | Franke .................... | E05B 73/00 166/85.1 |

(Continued)

*Primary Examiner* — William D Hutton, Jr.
*Assistant Examiner* — Dil K. Magar
(74) *Attorney, Agent, or Firm* — KIRTON McCONKIE; Evan R. Witt

(57) ABSTRACT

The disclosure relates to a security-locking device for a winch keyhole, including a housing, a main body and an elastic component. The housing includes an accommodation space, a top surface, a bottom surface, an engagement aperture and a notch. The engagement aperture is embedded in the top surface, the engagement aperture communicates with the accommodation space, the accommodation space passes through the bottom surface, and the notch is disposed between the top surface and the bottom surface. The main body is accommodated in the accommodation space, and includes a receiving seat. The elastic component is sandwiched between the housing and the main body, and includes a fixed portion and an elastic portion. The fixed portion is accommodated within the receiving seat, and the elastic portion is exposed outside the housing through the notch corresponding thereto. When the hosing is placed into the winch keyhole, the winch keyhole is not exposed.

16 Claims, 17 Drawing Sheets

(56) References Cited

U.S. PATENT DOCUMENTS

| | | | | |
|---|---|---|---|---|
| 4,136,541 A * | 1/1979 | Gramlich | F16B 41/005 | 70/231 |
| 4,191,036 A * | 3/1980 | Steinbach | E05B 27/083 | 70/404 |
| 4,231,240 A * | 11/1980 | Fujita | B60K 15/0409 | 220/210 |
| 4,290,283 A * | 9/1981 | Labrecque | B60B 7/16 | 70/232 |
| 4,645,373 A * | 2/1987 | Purdy | F16B 21/00 | 403/381 |
| 4,710,082 A * | 12/1987 | Curtis | F16B 41/005 | 411/429 |
| 4,870,842 A * | 10/1989 | Plumer | E05B 35/008 | 70/346 |
| 4,875,819 A * | 10/1989 | Wilkinson | F16B 41/005 | 411/432 |
| 4,927,287 A * | 5/1990 | Ohkawa | F16B 21/086 | 411/21 |
| 4,952,106 A * | 8/1990 | Kubogochi | F16B 19/1081 | 411/48 |
| 5,097,686 A * | 3/1992 | Plumer | E05B 35/008 | 70/346 |
| 5,119,653 A * | 6/1992 | Mazzotta | E05C 19/06 | 70/404 |
| D330,501 S * | 10/1992 | Steinbach | D8/347 | |
| 5,477,711 A * | 12/1995 | Oliveri | E05B 13/001 | 70/369 |
| 5,597,278 A * | 1/1997 | Peterkort | F16B 39/108 | 411/134 |
| 5,651,632 A * | 7/1997 | Gordon | F16B 21/06 | 411/338 |
| D443,498 S * | 6/2001 | Finch | D8/347 | |
| 6,412,315 B1 * | 7/2002 | Cheng | B60D 1/52 | 280/507 |
| 7,374,200 B2 * | 5/2008 | Ikeda | F16B 21/075 | 280/730.2 |
| 7,607,875 B2 * | 10/2009 | Shinozaki | F16B 21/078 | 411/21 |
| 8,381,556 B2 * | 2/2013 | Gilbert | F16L 55/1133 | 70/57.1 |
| 8,517,653 B2 * | 8/2013 | Ramsauer | F16B 19/109 | 411/347 |
| 8,807,900 B2 * | 8/2014 | Ramsauer | E05B 9/084 | 411/347 |
| 9,982,699 B2 * | 5/2018 | Risdale | F16B 21/02 | |
| 2003/0041634 A1 * | 3/2003 | Lenz | B60R 25/08 | 70/178 |
| 2007/0101778 A1 * | 5/2007 | Perks | E05B 17/0025 | 70/208 |
| 2008/0298925 A1 * | 12/2008 | Shinozaki | F16B 21/086 | 411/48 |
| 2011/0116890 A1 * | 5/2011 | Okada | F16B 19/1081 | 411/358 |
| 2012/0117768 A1 * | 5/2012 | Ramsauer | F16B 19/109 | 24/606 |
| 2013/0108393 A1 * | 5/2013 | Wong | F16B 5/0266 | 411/347 |
| 2014/0137612 A1 * | 5/2014 | Gresse | F16B 41/005 | 70/448 |
| 2014/0178147 A1 * | 6/2014 | Lin | F16B 41/005 | 411/197 |
| 2015/0167726 A1 * | 6/2015 | Cassagne | B64C 27/40 | 411/136 |
| 2017/0023047 A1 * | 1/2017 | Primeau | F16B 39/04 | |
| 2019/0113065 A1 * | 4/2019 | Koch | B60B 3/165 | |
| 2020/0240168 A1 * | 7/2020 | Sun | E04H 15/50 | |

* cited by examiner

SECURITY-LOCKING DEVICE FOR WINCH KEYHOLE

FIELD OF THE INVENTION

The present disclosure relates to a locking device, and more particularly to a security-locking device for a winch keyhole.

BACKGROUND OF THE INVENTION

For coupling or fastening mechanical structures or building component, bolts or screws are the most common tools. In several specific fields, the shape of the winch keyhole on the bolt head is limited to distinguish the application fields thereof. Taking an octagonal-keyhole bolt as an example, it is commonly used on a marine vessel to connect or fasten important device and equipment, so as to ensure that the connected or fastened important device and equipment are safe during navigation of the marine vessel. Moreover, wrong disassembling is avoided. On the other hand, when the important device and equipment are determined to be repaired or replaced, the bolts can only be disassembled through a specific wrench (winch key).

However, this type of bolts includes a keyhole in a specific shape, and the keyhole remains exposed even after the connection or fastening operation is completed. For the bolts used in several special environments, such as the octagonal-keyhole bolt used on a sailing ship, since the keyholes of the bolt remains exposed, personnel may improperly operate the bolt with the exposed keyhole, so that the bolts cannot be dismantled.

Therefore, it is necessary to provide a security-locking device for a winch keyhole. The overall structure is simplified, the size is small, and the operations are easy. It provides the safety protection for the winch keyhole and prevents the winch keyhole from being completely exposed, so as to effectively solve the foregoing problems and overcome the above drawbacks.

SUMMARY OF THE INVENTION

An object of the present disclosure is to provide a security-locking device for a winch keyhole. The housing of the security-locking device is corresponding to the opening of the winch keyhole. When the housing of the security-locking device is inserted into the winch keyhole, the elastic portion of the elastic component exposed outside the housing is abutted against the lateral wall of the winch keyhole, so that the security-locking device is locked in the winch keyhole. Moreover, the winch keyhole is not exposed to avoid damage to the winch keyhole, so as to protect the safety of the winch keyhole. For example, the security-locking device of the present disclosure can protect a winch keyhole of an octagonal-keyhole bolt applied to the sailing vessel effectively. Whereby, it prevents the winch keyhole from being improperly operated by personnel and then failing to dismantle the bolt. On the other hand, the user can use an operation key to engage with an engagement aperture of the housing, and use the operation key to drive the security-locking device to separate from the winch keyhole, so that the elastic portion is released to pass through and be exposed outside the housing, and then the winch keyhole is exposed. In that, a specific wrench can be used to engage with the winch keyhole, so as to perform the operations such as turning the winch keyhole of the bolt. The overall structure is simplified, the size is small, and the operations are easy. Moreover, it provides the safety protection for the winch keyhole and prevents the winch keyhole from being completely exposed.

Another object of the present disclosure is to provide a security-locking device for a winch keyhole. The housing of the security-locking device is corresponding to the opening of the winch keyhole. When the housing of the security-locking device is inserted into the winch keyhole, the elastic portion of the elastic component exposed outside the housing is abutted against the lateral wall of the winch keyhole, so that the security-locking device is locked in the winch keyhole. Moreover, with an adjusting element such as an adjusting screw, the distance between the bottom surface of the winch keyhole and the top surface of the housing are adjustable thereby, so that the top surface of the housing and top of the winch keyhole can be coplanar. It ensures that the winch keyhole is completely free of being exposed. The protection effect for the winch keyhole is achieved.

A further object of the present disclosure is to provide a security-locking device for a winch keyhole. The security-locking device is further formed as a symmetrical structure. A plurality of elastic components are arranged around the outer peripheral edge of the housing at an equal distance. Moreover, the plurality of elastic components are correspondingly to and pass through a plurality of notches, so as to be exposed outside the housing. For example, the housing and the winch keyhole are a symmetrical octagonal-star shape, and the plurality of notches are located at the equidistant convex corners of the octagonal-star shape, respectively. It facilitates the security-locking device to provide a stable engagement force when the security-locking device is inserted into the winch keyhole. Whereby, it prevents the security-locking device from detaching from the winch keyhole, and it ensures that the winch keyhole is not exposed.

According to an aspect of the present disclosure, a security-locking device for a winch keyhole is provided. The winch keyhole includes at least one lateral wall. The security-locking device includes a housing, a main body, at least one elastic component and an operation key. The housing spatially corresponds to the winch keyhole and includes an accommodation space, a top surface, a bottom surface, an engagement aperture and at least one notch. The engagement aperture is embedded in the top surface, the engagement aperture is in communication with the accommodation space, the accommodation space passes through the bottom surface, and the at least one notch is disposed between the top surface and the bottom surface and in communication with the accommodation space. The main body is accommodated within the accommodation space and includes at least one receiving seat spatially corresponding to the at least one notch of the housing. The at least one elastic component is sandwiched between the housing and the main body, and includes a fixed portion and an elastic portion. The fixed portion of the at least one elastic component is correspondingly received in the at least one receiving seat. The elastic portion protrudes out of the housing through the at least one notch corresponding thereto. The operation key includes an engagement portion spatially corresponding to the engagement aperture of the housing. The engagement portion is configured to engage with the engagement aperture, so that the housing is driven by the operation key, and the security-locking device is displaced relative to the winch keyhole. When the housing is placed in the winch keyhole, the elastic portion of the at least one elastic component abuts against the at least one lateral wall of the winch keyhole, and the elastic portion is retracted to the at least one notch, so that the security-locking device is engaged within the winch keyhole, and the winch keyhole is not exposed. When the engagement portion of the operation key and the engagement aperture of the housing are engaged with each other, and the security-locking device is driven by the operation key to separate from the winch keyhole, the elastic portion of the at least one elastic component is separated from the at least one lateral wall, so that the winch keyhole is exposed.

In an embodiment, the top surface of the housing and an opening of the winch keyhole have a similar contour shape.

In an embodiment, the top surface of the housing and the opening of the winch keyhole are an octagonal-star shape, wherein the at least one notch is located at a convex corner of the octagonal-star shape.

In an embodiment, the housing is formed as a symmetrical structure, the at least one notch includes a plurality of notches, and the at least one elastic component includes a plurality of elastic components, wherein the plurality of notches are corresponding to the plurality of elastic components, and arranged around an outer peripheral edge of the housing at an equal distance.

In an embodiment, the security-locking device further includes at least one connection component connected between the main body and the housing, and configured to mount the main body in the accommodation space of the housing, wherein the housing includes a first connection opening, the main body includes a second connection opening, the first connection opening and the second connection opening spatially correspond to and communicate with each other, and the at least one connection component passes through the first connection opening and the second connection opening to mount the main body in the accommodation space of the housing.

In an embodiment, the housing includes an opening disposed on the top surface, and the opening is in communication with the accommodation space through the engagement aperture, wherein the housing further includes a convex portion located in the opening, wherein the engagement aperture is disposed around an outer peripheral edge of the convex portion.

In an embodiment, the main body includes a hollow portion arranged at a center of the main body, and the hollow portion is in communication with the engagement aperture and the opening, wherein when the engagement portion of the operation key passes through the opening and the engagement aperture, the engagement portion is received within the hollow portion.

In an embodiment, the security-locking device further includes an adjusting element passing through and disposed in the main body, and configured to adjust a distance between a bottom surface of the adjusting element and the top surface of the housing.

In an embodiment, the main body includes a threaded hole passing through the main body, the adjusting element is an adjusting screw configured to match with the threaded hole.

In an embodiment, the adjusting element includes a recessed hole disposed on the bottom surface of the adjusting element and configured to be driven by a tool, so as to adjust the distance between the bottom surface of the adjustment element and the top surface of the housing.

According to another aspect of the present disclosure, a security-locking device for a winch keyhole is provided. The winch keyhole includes at least one lateral wall. The security-locking device includes a housing, a main body and at least one elastic component. The housing spatially corresponds to the winch keyhole and includes an accommodation space, a top surface, a bottom surface, an engagement aperture and at least one notch. The engagement aperture is embedded in the top surface, the engagement aperture is in communication with the accommodation space, the accommodation space passes through the bottom surface, and the at least one notch is disposed between the top surface and the bottom surface and in communication with the accommodation space. The main body is accommodated within the accommodation space and includes at least one receiving seat spatially corresponding to the at least one notch of the housing. The at least one elastic component is sandwiched between the housing and the main body, and includes a fixed portion and an elastic portion. The fixed portion of the at least one elastic component is correspondingly received in the at least one receiving seat. The elastic portion protrudes out of the housing through the at least one notch corresponding thereto. When the housing is placed in the winch keyhole, the elastic portion of the at least one elastic component abuts against the at least one lateral wall of the winch keyhole, and the elastic portion is retracted to the at least one notch, so that the security-locking device is engaged within the winch keyhole, and the winch keyhole is not exposed. When the engagement aperture of the housing is engaged with an operation key, and the security-locking device is driven by the operation key to separate from the winch keyhole, the elastic portion of the at least one elastic component is separated from the at least one lateral wall, so that the winch keyhole is exposed.

The above objects and advantages of the present disclosure become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only; it is not intended to be exhaustive or to be limited to the precise form disclosed.

Figure 1:
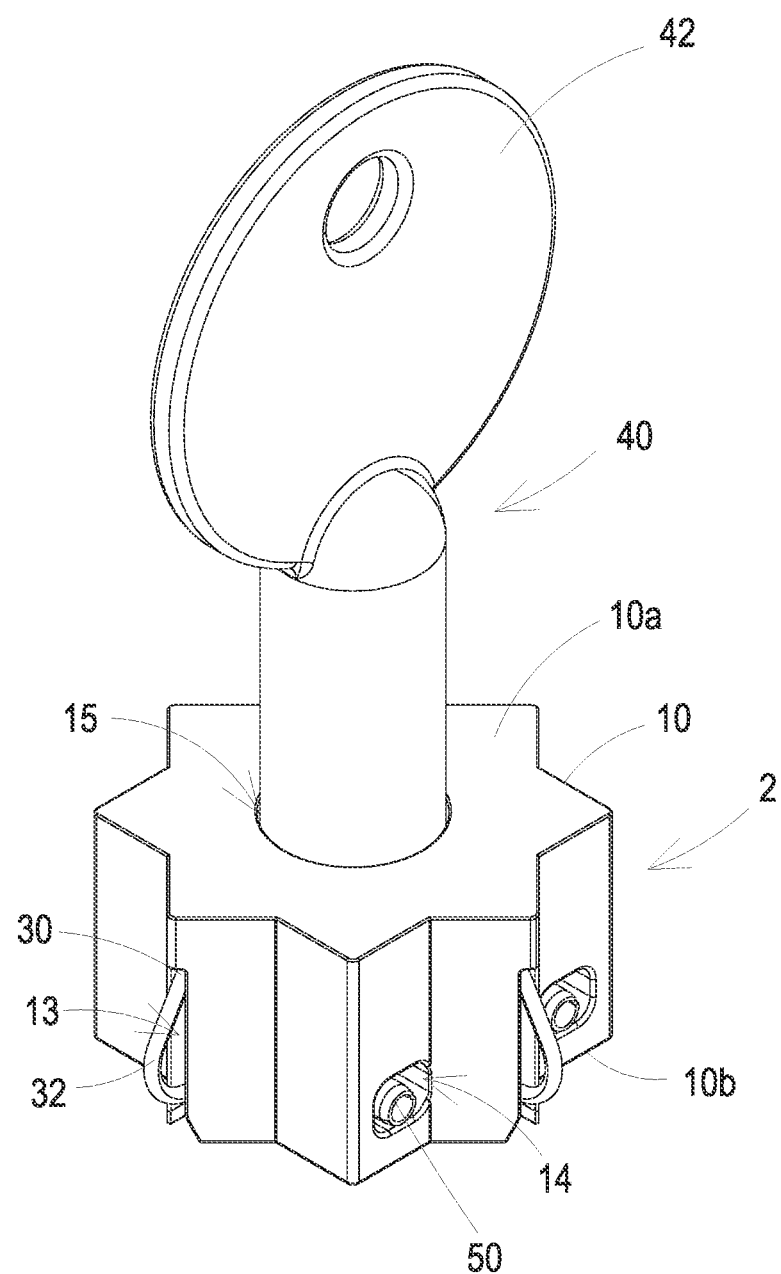
FIG. 1 is a perspective view illustrating a security-locking device according to an embodiment of the present disclosure.
Figure 2:
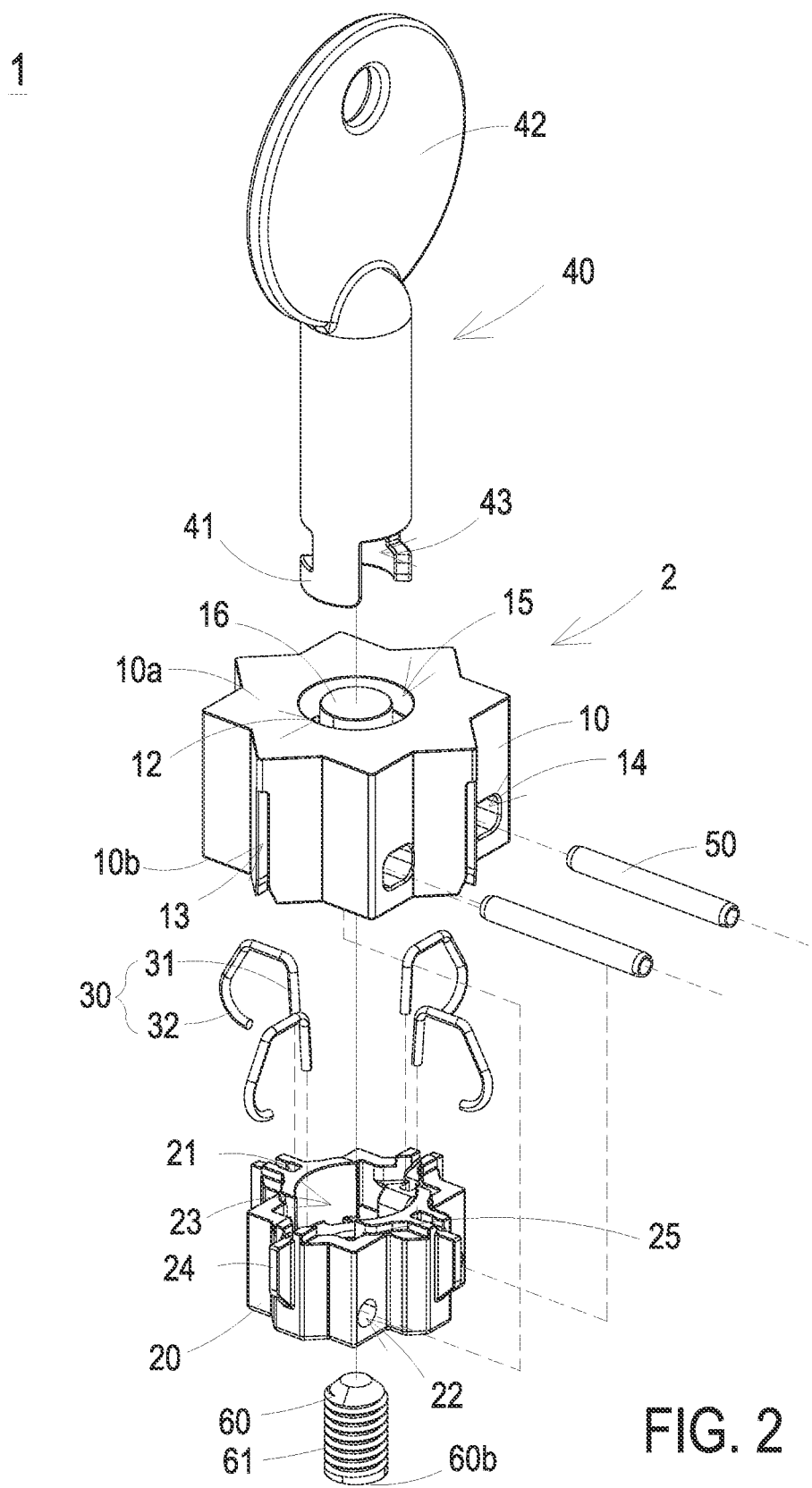
FIG. 2 is an exploded view illustrating the security-locking device according to the embodiment of the present disclosure.
Figure 3:
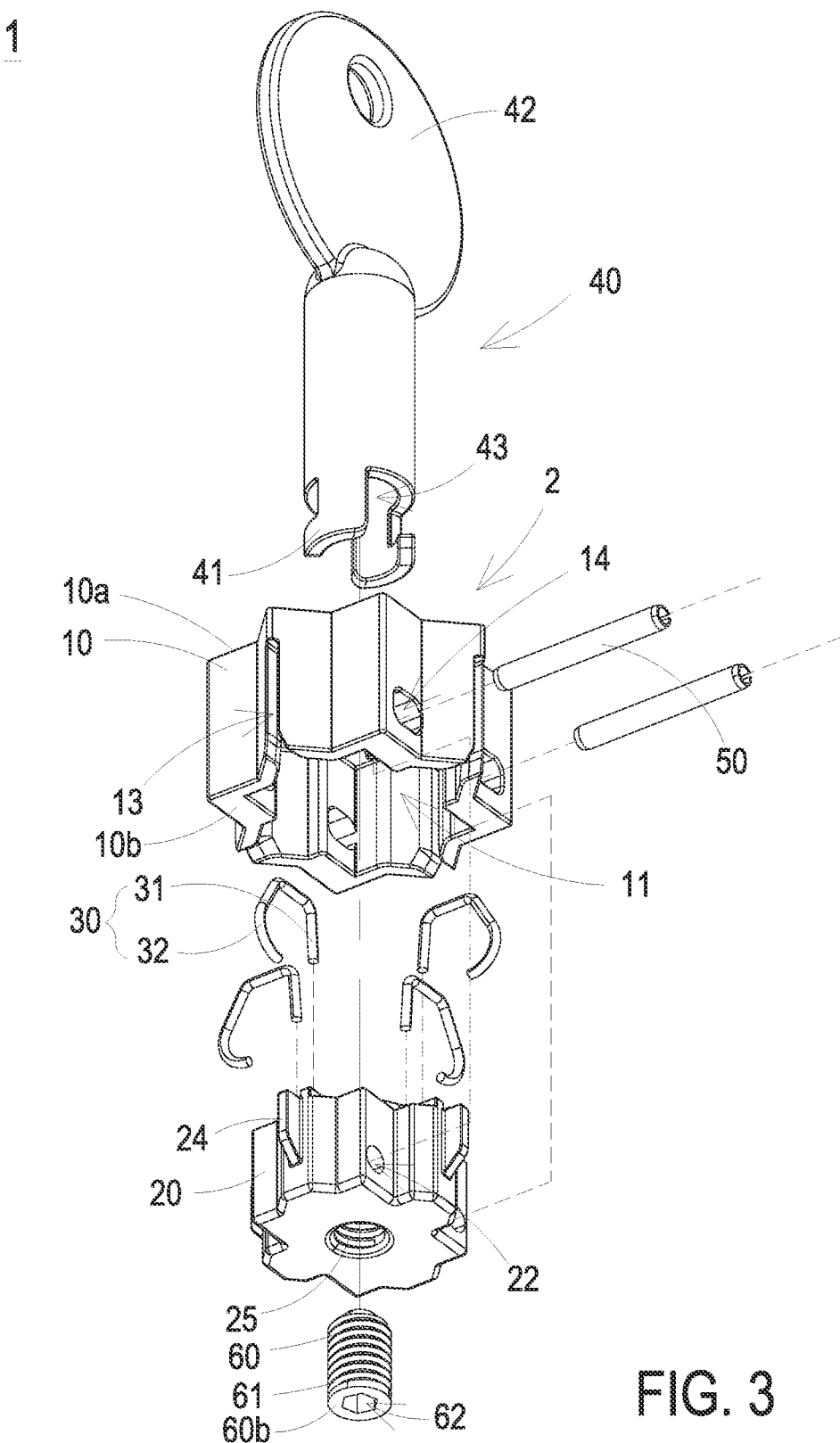
FIG. 3 is another exploded view illustrating the security-locking device according to the embodiment of the present disclosure and taken from another perspective.
Figure 4:
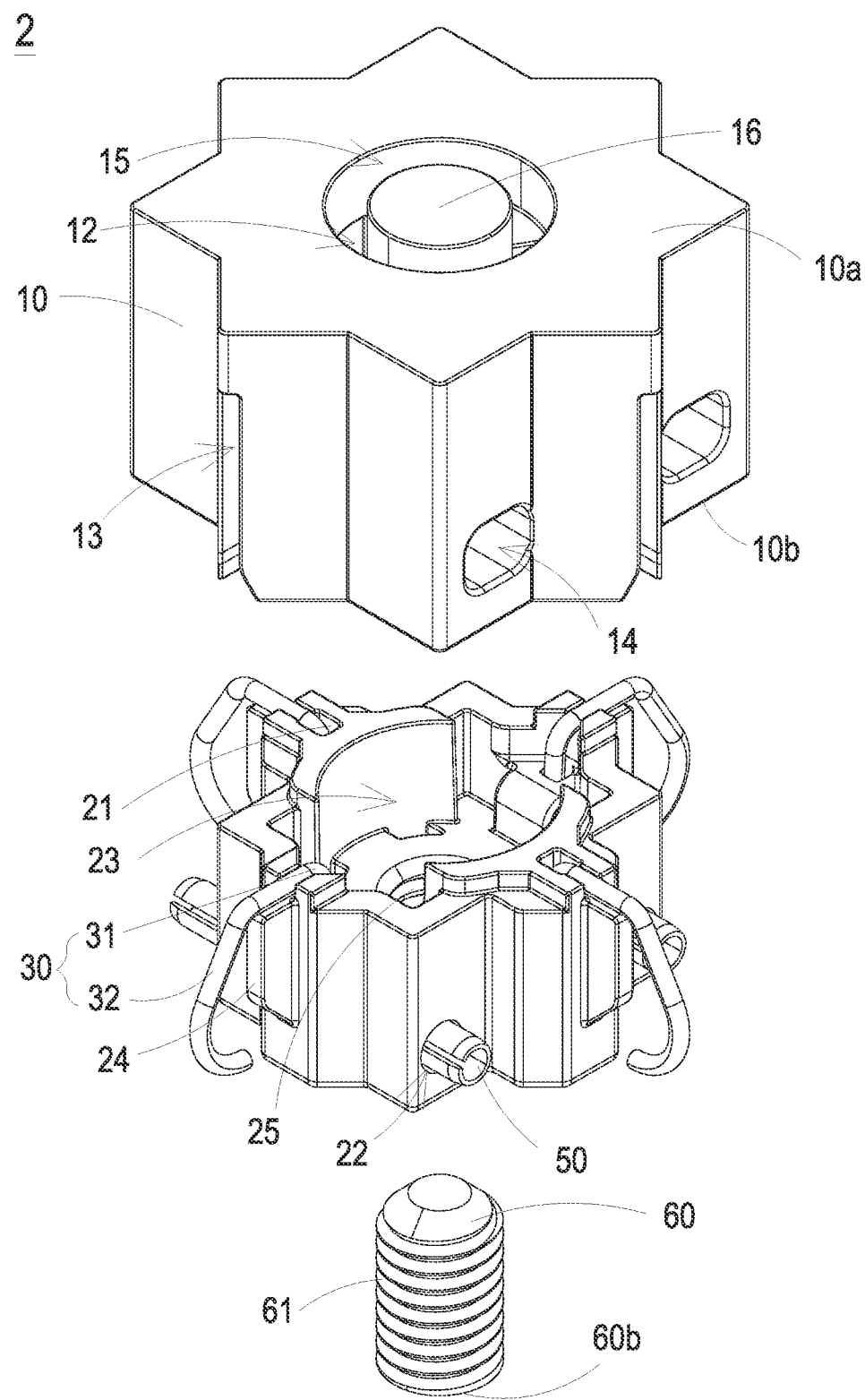
FIG. 4 is an exploded view illustrating the security-locking assembly of the security-locking device according to the embodiment of the present disclosure.
Figure 5:
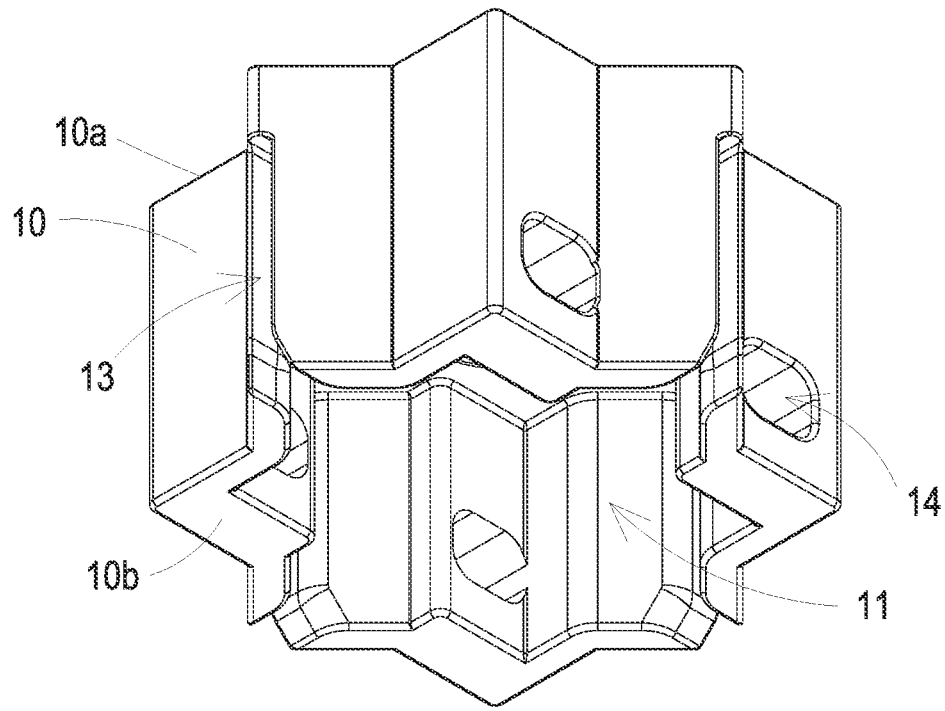
FIG. 5 is another exploded view illustrating the security-locking assembly of the security-locking device according to the embodiment of the present disclosure and taken from another perspective.
Figure 5:
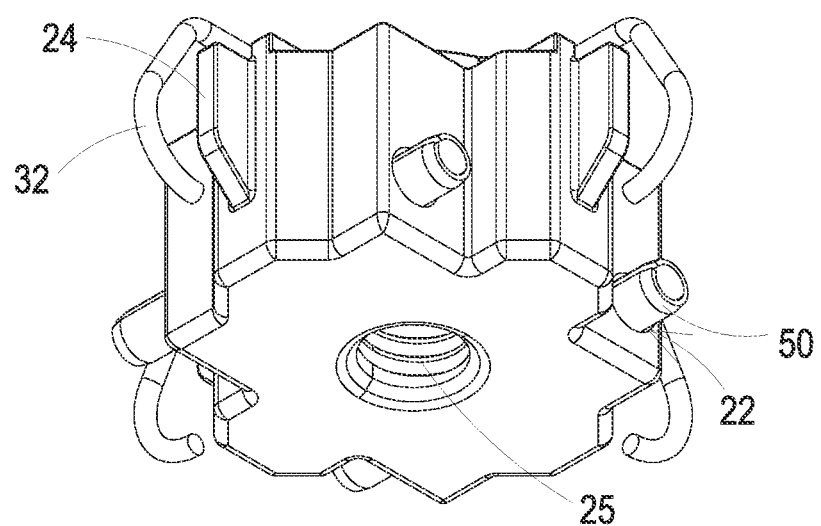
Figure 5:
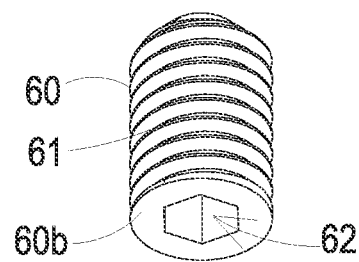
Figure 6:
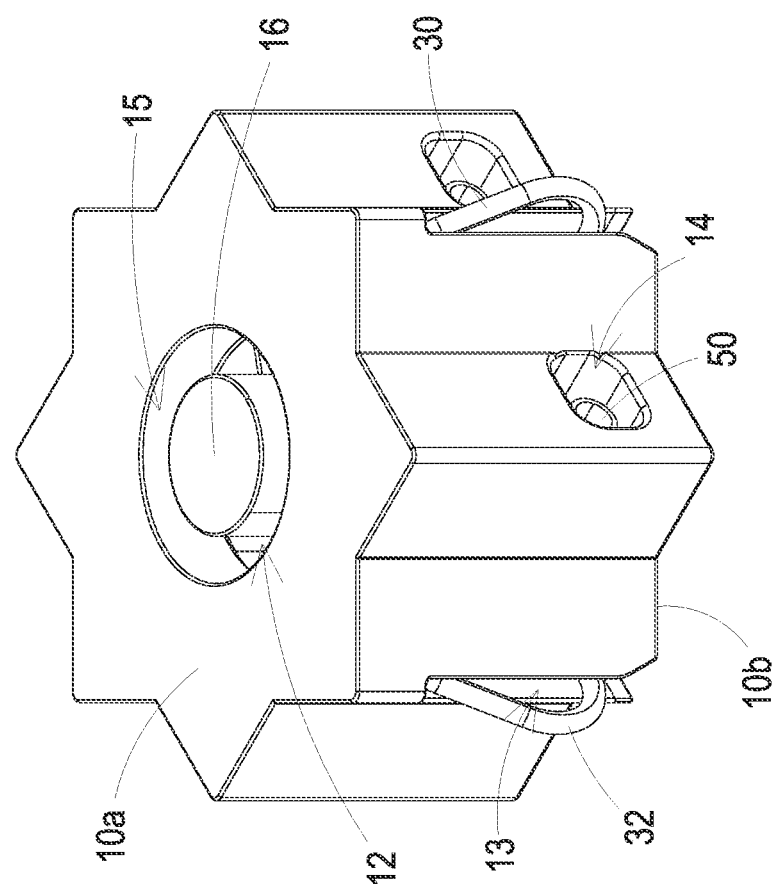
FIG. 6 is a perspective view illustrating the security-locking assembly of the security-locking device according to the embodiment of the present disclosure.
Figure 7A:
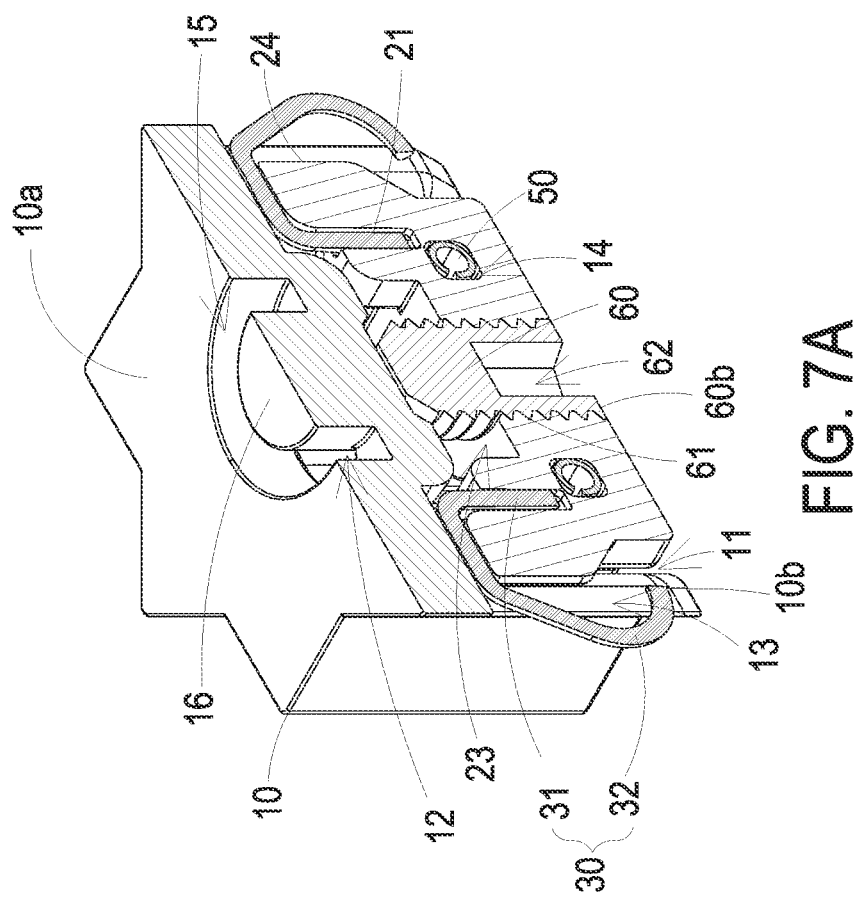
FIG. 7A is a cross-sectional structure illustrating the security-locking assembly of the security-locking device according to the embodiment of the present disclosure.
Figure 7B:
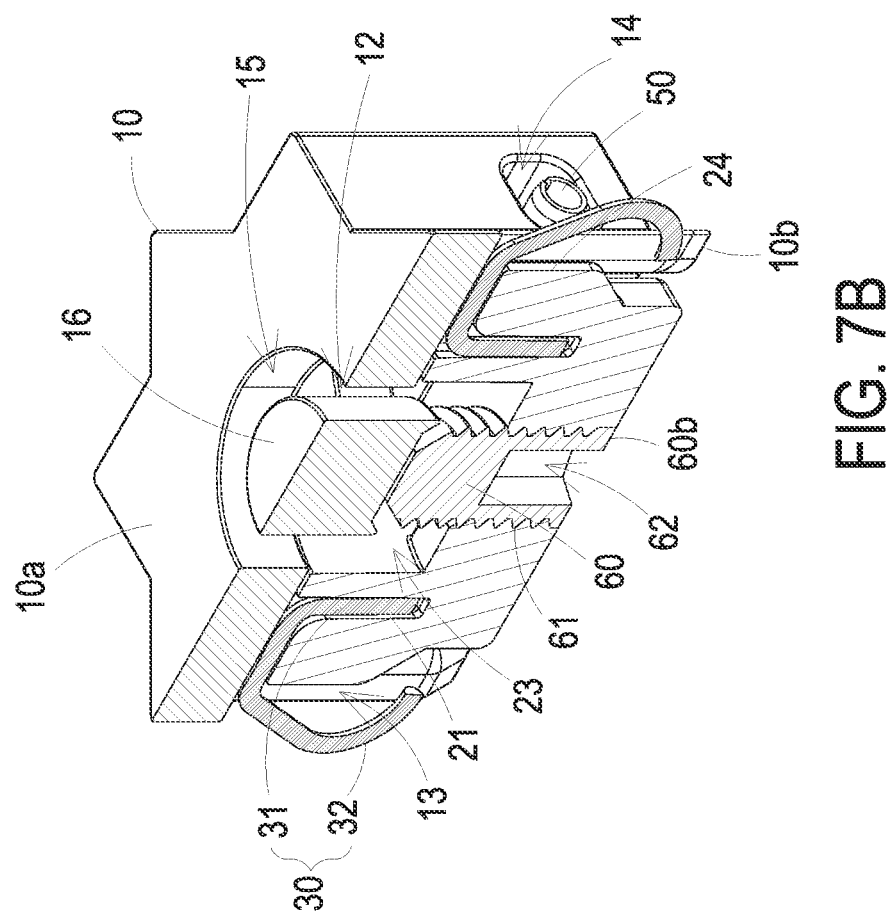
FIG. 7B is another cross-sectional structure illustrating the security-locking assembly of the security-locking device according to the embodiment of the present disclosure and taken from another perspective.
Figure 7C:
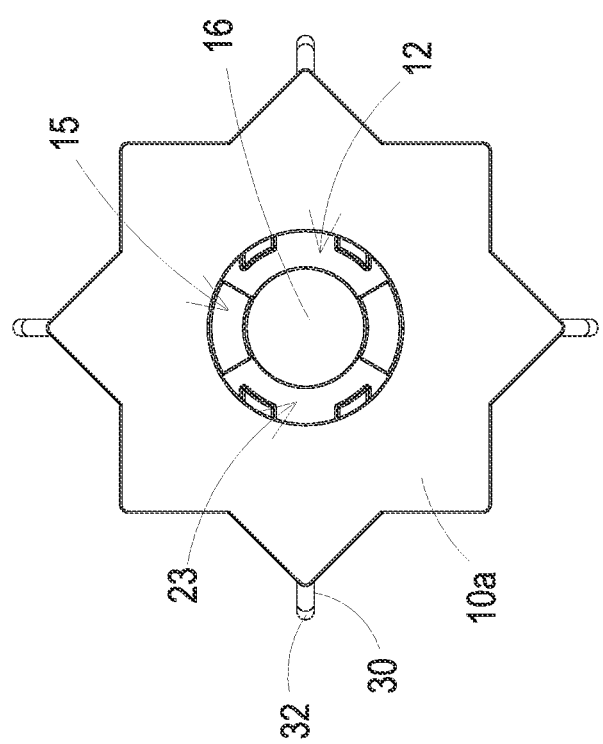
FIG. 7C is a top view illustrating the security-locking assembly of the security-locking device according to the embodiment of the present disclosure.
Figure 8:
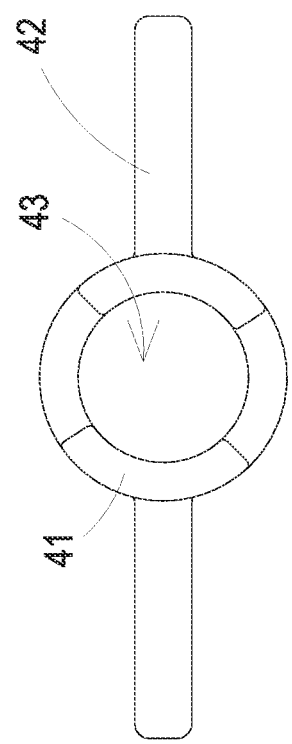
FIG. 8 is a bottom view illustrating the operation key of the security-locking device according the embodiment of the present disclosure.
Figure 9:
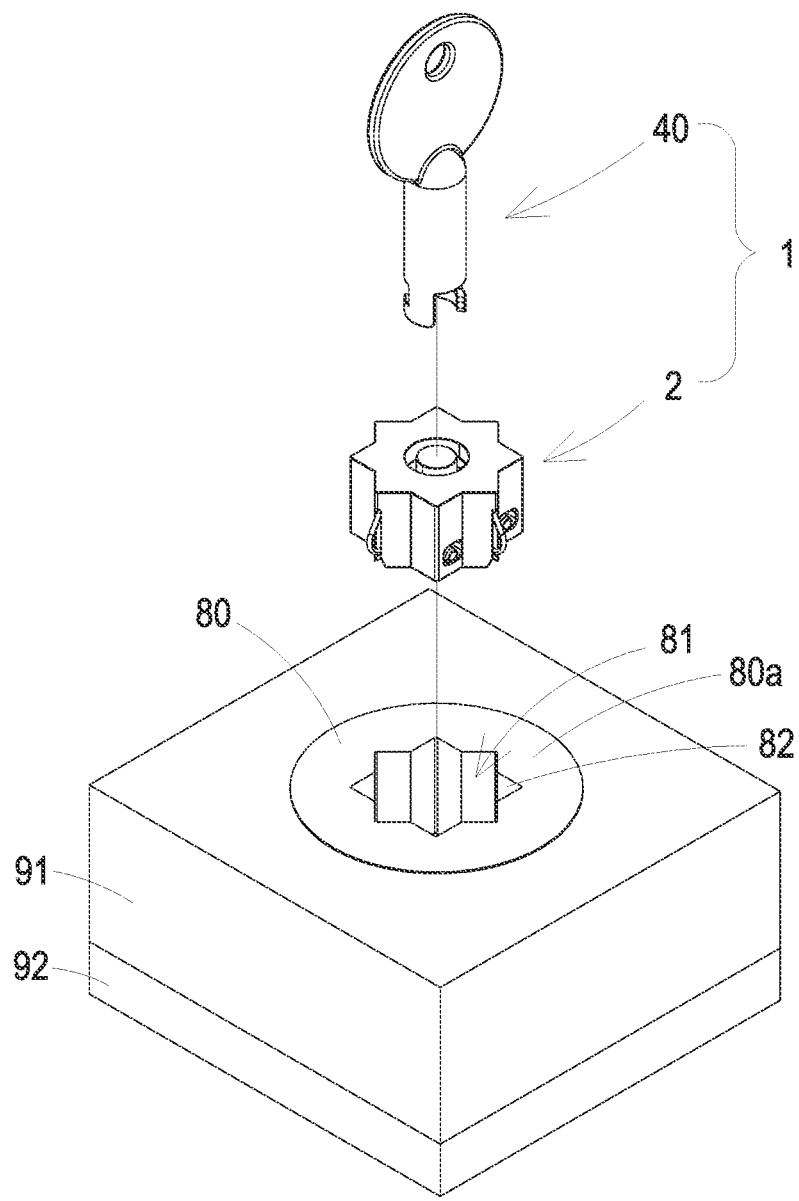
FIG. 9 is a perspective view showing the security-locking device and the winch keyhole corresponding to each other according to the embodiment of the present disclosure.

FIG. 1 is a perspective view illustrating a security-locking device according to an embodiment of the present disclosure. FIGS. 2 and 3 are exploded views illustrating the security-locking device according to the embodiment of the present disclosure. FIGS. 4 and 5 are exploded view illustrating the security-locking assembly of the security-locking device according to the embodiment of the present disclosure. FIG. 6 is a perspective view illustrating the security-locking assembly of the security-locking device according to the embodiment of the present disclosure. FIGS. 7A and 7B are cross-sectional structures illustrating the security-locking assembly of the security-locking device according to the embodiment of the present disclosure. FIG. 7C is a top view illustrating the security-locking assembly of the security-locking device according to the embodiment of the present disclosure. FIG. 8 is a bottom view illustrating the operation key of the security-locking device according the embodiment of the present disclosure. FIG. 9 is a perspective view showing the security-locking device and the winch keyhole corresponding to each other according to the embodiment of the present disclosure. In the embodiment, the security-locking device 1 is suitable for a winch keyhole 81 with a special shape. Preferably but not exclusively, the winch keyhole 81 is disposed on an octagonal bolt 80 used on a sailing vessel. The octagonal bolt 80 is configured to connect and fasten the first object 91 and the second object 92. Certainly, the winch keyhole 81 applicable to the security-locking device 1 of the present disclosure is not limited thereto. It is exemplified only. In the embodiment, the winch keyhole 81 includes at least one lateral wall 82. The security-locking device 1 includes a housing 10, a main body 20, at least one elastic component 30 and an operation key 40. In the embodiment, preferably but not exclusively, the security-locking device 1 without the operation key 40 is further defined as a security-locking assembly 2, that is as shown in FIGS. 4 to 6 and FIGS. 7A to 7C. In the embodiment, the housing 10 spatially corresponds to the winch keyhole 81. Moreover, the housing 10 includes an accommodation space 11, a top surface 10a, a bottom surface 10b, an engagement aperture 12 and at least one notch 13. In the embodiment, the top surface 10a of the housing 10 and an opening of the winch keyhole 81 have a similar contour shape. Preferably but not exclusively, the top surface 10a of the housing 10 and the opening of the winch keyhole 81 have a symmetrical octagonal-star shape. In the embodiment, the engagement aperture 12 is embedded in the top surface 10a, the engagement aperture 12 is in communication with the accommodation space 11, the accommodation space 11 passes through the bottom surface 10b. Moreover, the at least one notch 13 is disposed between the top surface 10a and the bottom surface 10b and in communication with the accommodation space 11. Preferably but not exclusively, the notch 13 is recessed from the bottom surface 10b toward the top surface 10a. Certainly, the present disclosure is not limited thereto. In an embodiment, the notch 13 is recessed from the top surface 10a toward the bottom surface 10b. In other embodiments, the notch 13 is arbitrarily recessed from the top surface 10a or/and the bottom surface 10b to communicate with the accommodation space 11. Notably, in an embodiment, the housing 10 further includes an opening 15 disposed on the top surface 10a of the housing 10. The opening 15 is in communication with the accommodation space 11 through the engagement aperture 12. In addition, the housing 10 further includes a convex portion 16 located in the opening 15. Preferably but not exclusively, the engagement aperture 12 is arranged around an outer peripheral edge of the convex portion 16. In other words, the engagement aperture 12 can be for example but not limited to a part of an annular opening formed in the opening 15. Certainly, the present disclosure is not limited thereto.

In the embodiment, the main body 20 is accommodated within the accommodation space 11 of the housing 10, and includes at least one receiving seat 21 spatially corresponding to the at least one notch 13 of the housing 10. The at least one elastic component 30 is sandwiched between the housing 10 and the main body 20, and includes a fixed portion 31 and an elastic portion 32. The fixed portion 31 of the at least one elastic component 30 is correspondingly received in the at least one receiving seat 21 of the main body 20. The elastic portion 32 protrudes out of the housing 10 through the at least one notch 13 of the housing 10 which are corresponding to each other. In the embodiment, preferably but not exclusively, the main body 20 is assembled into the accommodation space 11 of the housing 10 through the bottom surface 10b of the housing 10. Moreover, when the housing 10 and the main body 20 are assembled together, the at least one elastic component 30 is further sandwiched between the housing 10 and main body 20. Notably, in the embodiment, the security-locking device 1 further includes at least one connection component 50 connected between the main body 20 and the housing 10, and configured to mount the main body 20 in the accommodation space 11 of the housing 10. In addition, preferably but not exclusively, the housing 10 includes a first connection opening 14, the main body 20 includes a second connection opening 22. The first connection opening 14 and the second connection opening 22 spatially correspond to and communicate with each other. In the embodiment, the at least one connection component 50 passes through the first connection opening 14 and the second connection opening 22 to mount the main body 20 in the accommodation space 11 of the housing 10. In the embodiment, the security-locking device 1 includes two connection components 50, two first connection openings 14 and two second connection openings 22. For assembling the housing 10, the main body 20 and the elastic components 30, the main body 20 is inserted into the accommodation space 11 from the bottom surface 10b of the housing 10, and the elastic components 30 are sandwiched between the housing 10 and the main body 20. Then, the connection components 50 penetrate the housing 10 and the main body 20 through the corresponding first connection openings 14 and the corresponding second connection openings 22, respectively, so that the housing 10 and the main body 20 are fixed to each other, and the elastic components 30 are sandwiched between the housing 10 and the main body 20. In other embodiments, the number, the type and the connection mode of the connection components 50, the first connection openings 14 and the second connection openings 22 are adjustable according to the practical requirements. The present disclosure is not limited thereto.

Moreover, in the embodiment, the main body 20 further includes a hollow portion 23 arranged at a center of the main body 20. After the main body 20 and the housing 10 are assembled together, the hollow portion 23 of the main body 20 is in communication with the engagement aperture 12 and the opening 15 of the housing 10. In the embodiment, preferably but not exclusively, the main body 20 includes at least one protrusion 24 disposed on an outer periphery of the main body 20 and spatially corresponds to the receiving seat 21, the notch 13 of the housing 10, and the elastic portion 32 of the elastic component 30, so that the protrusion 24 and the corresponding receiving seat 21 are assembled and matched to stabilize the arrangement of the elastic component 30 corresponding thereto. Notably, in the embodiment, the numbers of the notches 13, the elastic components 30, the receiving seats 21 and the protrusions 24 are for example four, respectively, and arranged around an outer peripheral edge of the housing 10 at an equal distance. For example, the notches 13, the elastic components 30, the receiving seats 21 and the protrusions 24 are disposed at and corresponding to the four equidistant convex corners of the octagonal-star shape. In an embodiment, the numbers of the notches 13, the elastic components 30, the receiving seats 21 and the protrusions 24 are for example but not limited to eight, respectively, and disposed at the eight equidistant convex corners of the octagonal-star shape. Certainly, in other embodiments, the number and the arrangement positions of the notches 13, the elastic components 30, the receiving seats 21 and the protrusions 24 are adjustable according to the practical requirements. The present disclosure is not limited thereto.

In the embodiment, the operation key 40 includes an engagement portion 41 and a holding portion 42, which are spatially corresponding to the engagement aperture 12 of the housing 10. In the embodiment, the engagement portion 41 of the operation key 40 is configured to engage with the engagement aperture 12 of the housing 10. The user can pull the housing 10 through the holding portion 42 of the operation key 40 to displace the security-locking device 1 relative to the winch keyhole 81. In the embodiment, preferably but not exclusively, the engagement aperture 12 is in the shape of symmetrical double quotation marks, as shown in FIG. 7C. The engagement aperture 12 is formed in the opening 15, located at the outer periphery of the convex portion 16, and in communication with the accommodation space 11 and the hollow portion 23 of the main body 20. In the embodiment, the engagement portion 41 of the operation key 40 is spatially corresponding to the engagement aperture 12 of the housing 10, which is also in the shape of symmetrical double quotation marks, as shown in FIG. 8. When the engagement portion 41 of the operation key 40 is corresponding to the engagement aperture 12 of the housing 10, the engagement portion 41 of the operation key 40 is capable of passing through the opening 15 and the engagement aperture 12 and entering the accommodation space 11, so that the engagement portion 41 is received within the hollow portion 23 of the main body 20. In addition, the operation key 40 further includes a positioning slot 43 formed in the engagement portion 41. When the engagement portion 41 of the operation key 40 passes through the opening 15 and the engagement aperture 12, the positioning slot 43 and the convex portion 16 are matched to each other. It facilitates the operation key 40 to connect to the housing 10. In addition, when the operation key 40 is rotated relative to the housing 10 around the convex portion 16 as the center, it is further ensured that the engagement portion 41 and the engagement aperture 12 are engaged with each other. Certainly, in other embodiments, the engagement aperture 12 of the housing 10 and the engagement portion 41 of the operation key 40 can be for example but not limited to geometric shapes matched to each other, and adjustable according to the practical requirements. The present disclosure is not limited thereto, and not redundantly described herein.

In the embodiment, the security-locking device 1 further includes an adjusting element 60 passing through and disposed in the main body 20. The adjusting element 60 is configured to adjust a distance between a bottom surface 60b of the adjusting element 60 and the top surface 10a and the bottom surface 10b of the housing 10. It is advantageous for the security-locking device 1 to be applied to the winch keyhole 81 with a different depth. Preferably but not exclusively, the main body 20 includes a threaded hole 25 passing through the main body 20, and the adjusting element 60 is an adjusting screw 61 configured to match with the threaded hole 25. In the embodiment, the adjusting element 60 further includes a recessed hole 62 disposed on the bottom surface 60b of the adjusting element 60 and configured to be driven by a tool of hex wrench, so as to adjust the distance between the bottom surface 60b of the adjustment element 60 and the top surface 10a or the bottom 10b of the housing 10. The present disclosure is not limited thereto.

Figure 10:
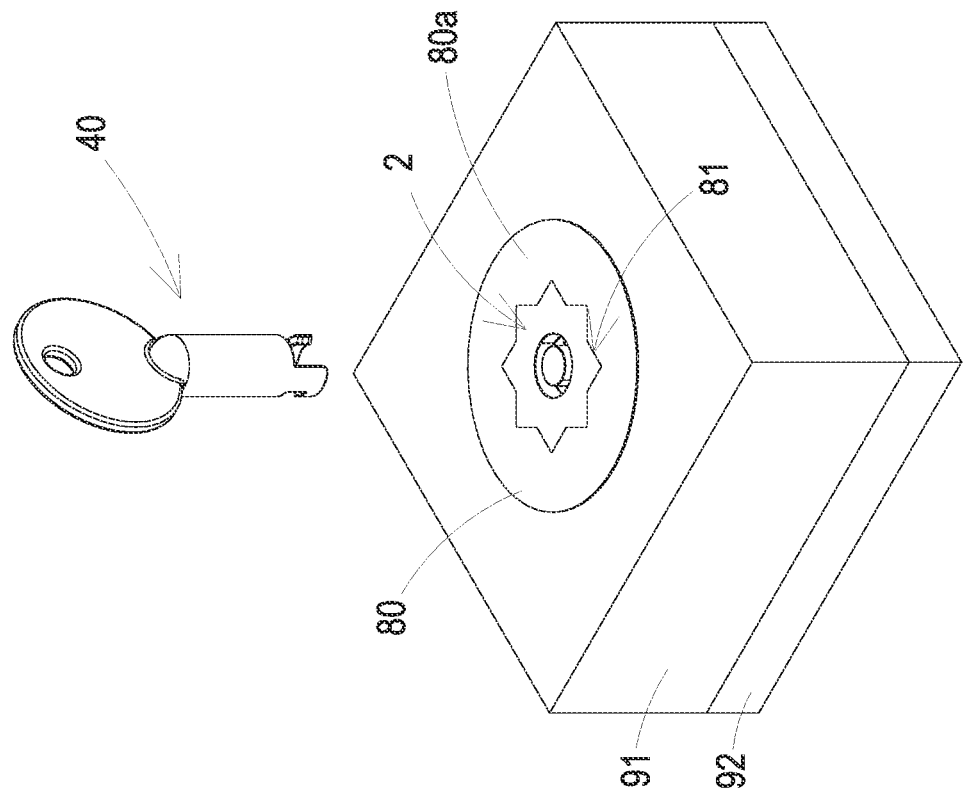
FIG. 10 is a perspective view showing the security-locking assembly of the security-locking device placed in the winch keyhole, and the operation key separated from the engagement aperture.
Figure 11:
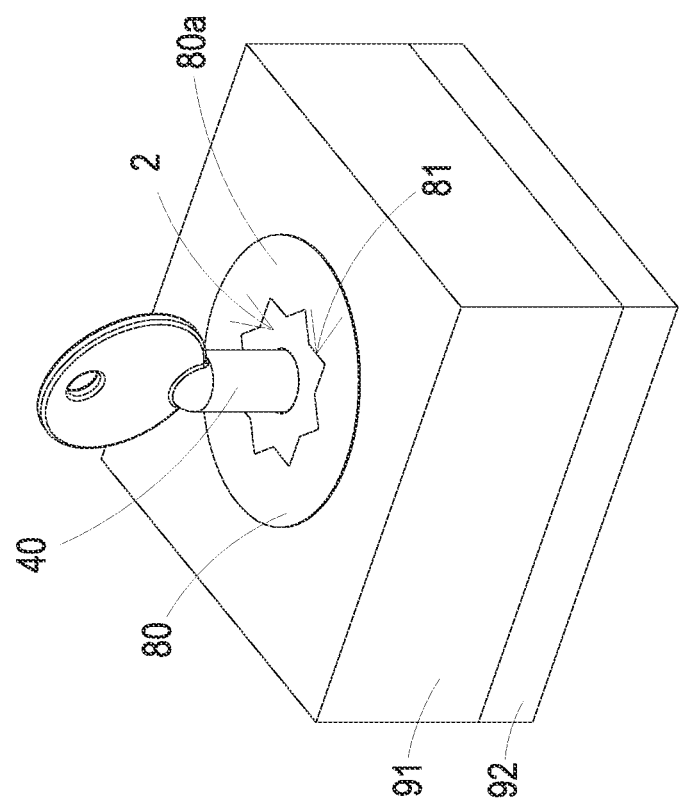
FIG. 11 is a perspective view showing the security-locking assembly of the security-locking device placed in the winch keyhole, and the operation key connected to the engagement aperture.
Figure 12:
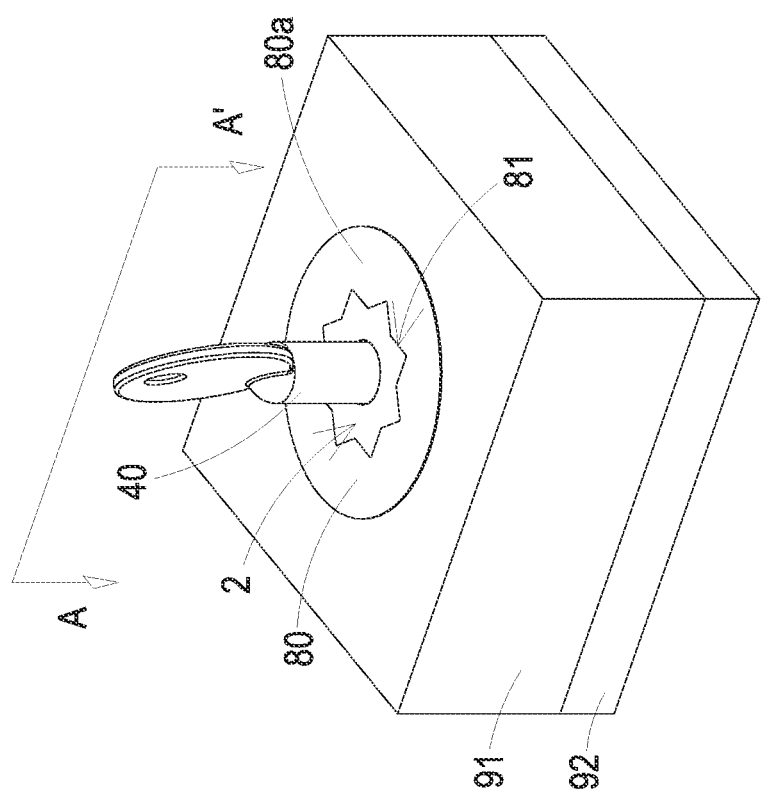
FIG. 12 is a perspective view showing the security-locking assembly of the security-locking device placed in the winch keyhole, and the operation key engaged with the engagement aperture.
Figure 13A:
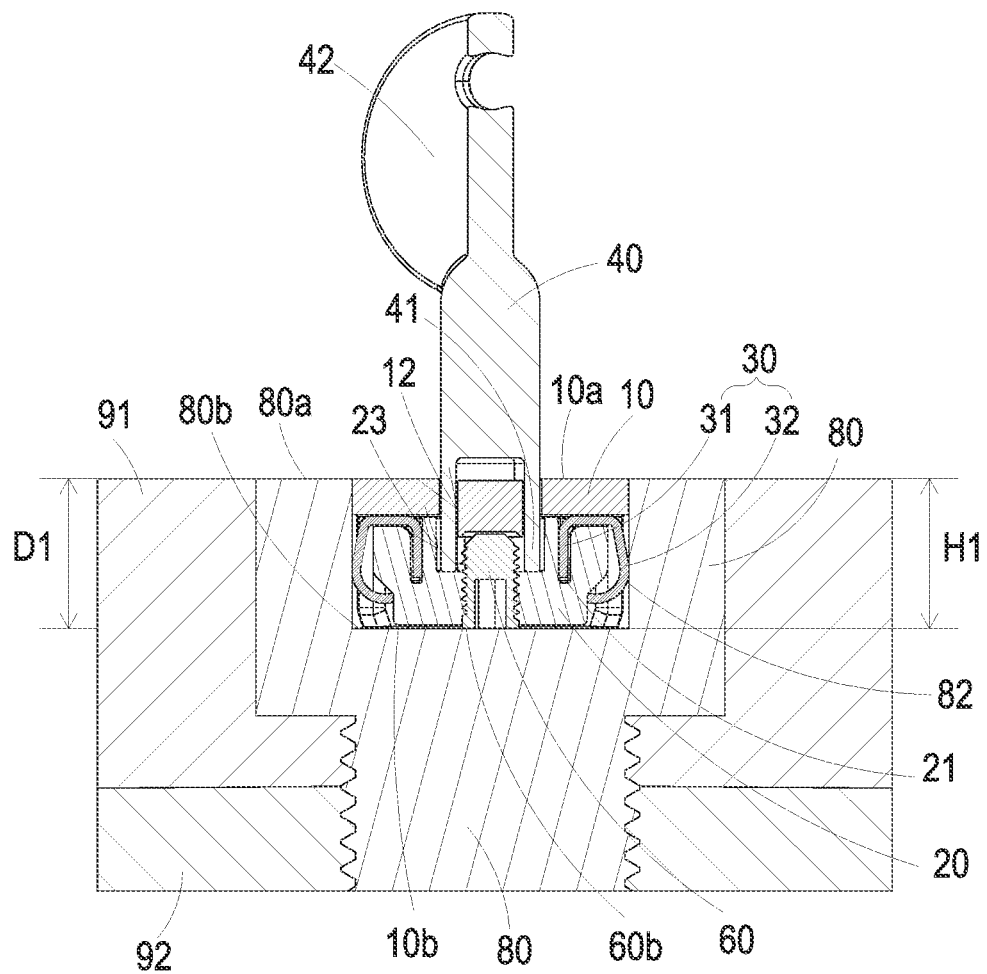
FIG. 13A is a cross-sectional view taken along the line AA' of FIG. 12.
Figure 13B:
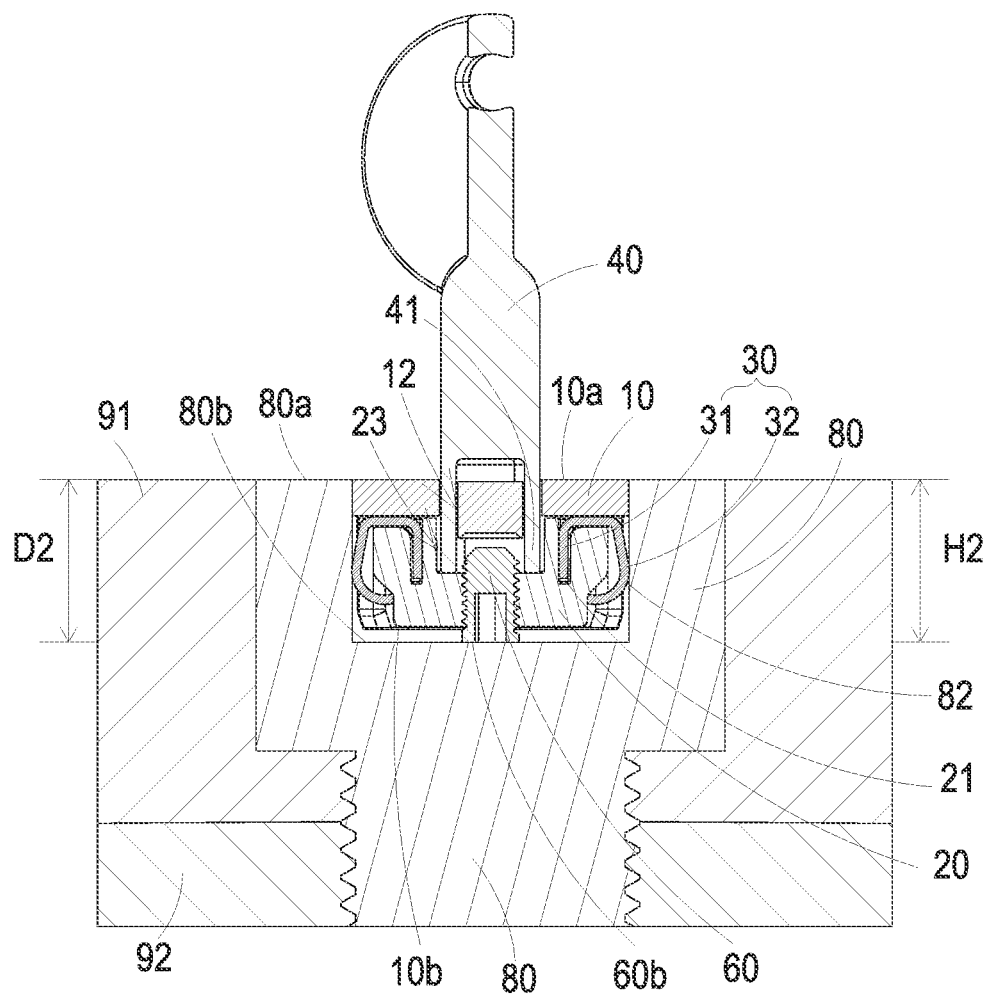
FIG. 13B is a cross-sectional view showing the security-locking assembly of the security-locking device placed in another winch keyhole, and the operation key engaged with the engagement aperture.
Figure 14:
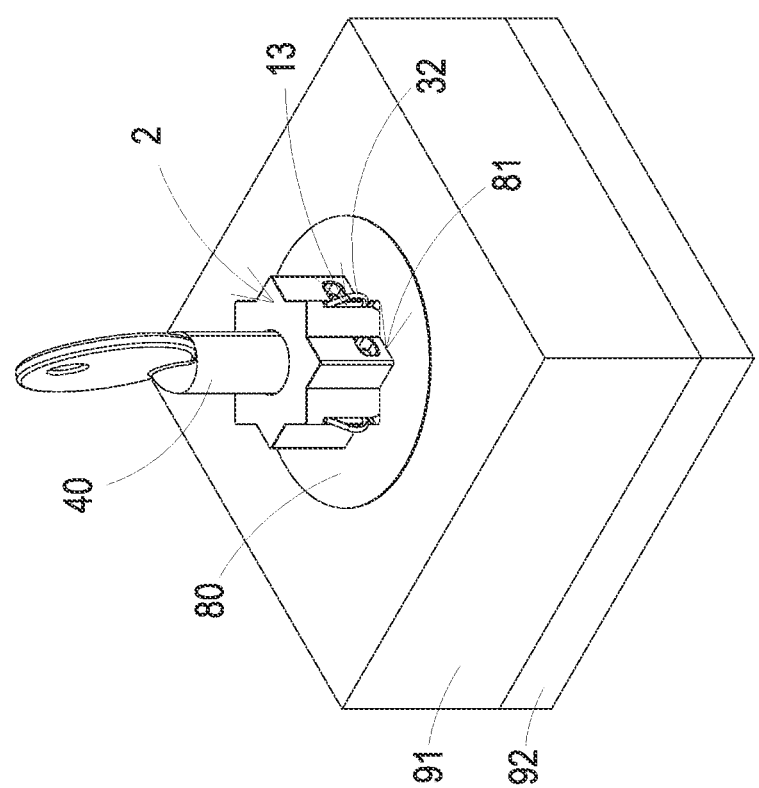
FIG. 14 is a perspective view showing the security-locking device separated from the winch keyhole.

The operational relationship between the security-locking device 1 and the operation key 40 corresponding thereto in the present disclosure will be further described as the following. FIG. 10 is a perspective view showing the security-locking assembly of the security-locking device placed in the winch keyhole, and the operation key separated from the engagement aperture. FIG. 11 is a perspective view showing the security-locking assembly of the security-locking device placed in the winch keyhole, and the operation key connected to the engagement aperture. FIG. 12 is a perspective view showing the security-locking assembly of the security-locking device placed in the winch keyhole, and the operation key engaged with the engagement aperture. FIG. 13A is a cross-sectional view taken along the line AA' of FIG. 12. FIG. 13B is a cross-sectional view showing the security-locking assembly of the security-locking device placed in another winch keyhole, and the operation key engaged with the engagement aperture. FIG. 14 is a perspective view showing the security-locking device separated from the winch keyhole. Please refer to FIGS. 1 to 14. In the embodiment, the operation key 40 and the security-locking assembly 2 are detachably connected to each other. When the engagement portion 41 of the operation key 40 and the engagement aperture 12 of the housing 10 are matched to each other, the engagement portion 41 can pass through the opening 15 and the engagement aperture 12 of the housing 10 and enters into the accommodation space 11. In that, the engagement portion 41 is further accommodated in the hollow portion 23 of the main body 20. Alternatively, when the engagement portion 41 of the operation key 40 and the engagement aperture 12 of the housing 10 are matched to each other, the operation key 40 connected to the security-locking assembly 2 can be detached from the security-locking assembly 2. In the embodiment, the bottom surface 10b of the housing 10 of the security-locking assembly 2 can be directly inserted into the winch keyhole 81 while the bottom surface 10b of the housing 10 of the security-locking assembly 2 faces the opening of the winch keyhole 81, as shown in FIG. 10. At this time, the elastic portion 32 of the elastic component 30 abuts the lateral wall 82 of the winch keyhole 81, and the elastic portion 32 is retracted to the notch 13, so that the security-locking assembly 2 of the security-locking device 1 is engaged within the winch keyhole 81, and the winch keyhole 81 is free of being exposed. Since the security-locking assembly 2 of the security-locking device 1 is engaged within the winch keyhole 81 and the winch keyhole 81 is kept from being exposed, the damage to the winch keyhole is avoided, and the safety protection of the winch keyhole 81 is achieved.

Preferably but not exclusively, the winch keyhole 81 is matched with an octagonal bolt 80 used on a sailing vessel. When the octagonal bolt 80 is utilized to connect and fasten a first object 91 and a second object 92, the protection effect for the winch keyhole 81 is achieved by engaging the security-locking assembly 2 of the security-locking device 1 of the present disclosure within the winch keyhole 81. It prevents the winch keyhole 81 from being improperly operated by personnel, and then failing to dismantle the octagonal bolt 80. In addition, the security-locking assembly 2 of the security-locking device 1 is further formed as a symmetrical structure, and a plurality of elastic components 30 are arranged around the outer peripheral edge of the housing 10 at an equal distance, and corresponding to the plurality of notches 13, respectively. Preferably but not exclusively, the housing 10 and the winch keyhole 81 are a symmetrical octagonal-star shape, and the plurality of notches 13 are located at the four equidistant convex corners of the octagonal-start shape, respectively. It facilitates the security-locking device 1 to provide a stable engagement force when the security-locking assembly 2 of the security-locking device 1 is inserted into the winch keyhole 81. Whereby, it prevents the security-locking assembly 2 of the security-locking device 1 from detaching from the winch keyhole 81, and it ensures that the winch keyhole 81 is not exposed.

On the other hand, when the octagonal bolt 80 needs to be detached from the first object 91 and the second object 92, the user can use the operation key 40 to engage with the engagement aperture 12 of the housing 10. The operation key 40 is used to drive the security-locking assembly 2 of the security-locking device 1 to be detached from the winch keyhole 81. Moreover, the elastic portion 32 is released to pass through the housing 10 and exposed outside the housing 10, so that the winch keyhole 81 is restored to be exposed. After that, a tool such as a specific wrench is used to engage with the winch keyhole 81 to perform operations such as turning the winch keyhole 81 to detach the octagonal bolt 80 from the first object 91 and the second object 92. The detailed operation steps are described as the following.

Firstly, the user holds the holding portion 42 of the operation key 40 to align the engagement portion 41 of the operation key 40 with the engagement aperture 12 of the housing 10 of the security-locking assembly 2, and then makes the engagement portion 41 pass through the opening 15 and the engagement aperture 12 of the housing 10. In that, the engagement portion 41 of the operation key 40 is inserted into the accommodation space 11 and is further accommodated in the hollow portion 23 of the main body 20. At this time, the operation key 40 and the security-locking assembly 2 are detachably connected to each other, as shown in FIG. 11. Secondly, the user rotates the operation key 40, and the operation key 40 is rotated relative to the housing 10 around the convex portion 16 as the center. When the engagement portion 41 of the operation key 40 and the engagement aperture 12 of the housing 10 are maintained in an engaged state, as shown in FIG. 12, the operation key 40 cannot be separated from the security-locking assembly 2. On the other hand, when the user pulls the holding portion 42 of the operation key 40, the security-locking assembly 2 of the security-locking device 1 is driven by the operation key 40, and further separated from the winch keyhole 81, as shown in FIG. 14. As the security-locking assembly 2 is separated from the winch keyhole 81, the elastic portion 32 of the elastic component 30 is also separated away from the lateral wall 82 of the winch keyhole 81, so that the elastic portion 32 is released to pass through the housing 10 and exposed outside the housing 10. Moreover, the winch keyhole 81 is restored to be exposed. Certainly, the present disclosure is not limited thereto.

Please refer to FIG. 13A. On the other hand, in the embodiment, since the housing 10 of the security-locking device 1 is corresponding to the opening of the winch keyhole 81, when the housing 10 of the security-locking assembly 2 is inserted into the winch keyhole 81, the elastic portion 32 of the elastic component 30 exposed outside the housing 10 abuts against the lateral wall 82 of the winch keyhole 81, so that the security-locking assembly 2 of the security-locking device 1 is engaged within the winch keyhole 81. Moreover, in the embodiment, preferably but not exclusively, the top surface 10a of the housing 10 and the top surface 80a of the octagonal bolt 80 are coplanar, and the bottom surface 10b of the housing 10 is attached to the bottom surface 80b of the winch keyhole 81. In other words, the height H1 of the housing 10 of the security-locking assembly 2 is the same as the depth D1 of the winch keyhole 81. In that, it ensures that the winch keyhole 81 is completely free of being exposed. The protection effect for the winch keyhole 81 is achieved.

Furthermore, notably, the winch keyhole 81 on the different octagonal bolt 80 may have a different depth D1. Please refer to FIG. 13B. In the embodiment, the height H1 of the housing 10 of the security-locking assembly 2 is smaller than the depth D2 of the other winch keyhole 81. Preferably but not exclusively, in the security-locking assembly 2, the distance between the bottom surface 60b of the adjusting element 60 and the top surface 10a of the housing 10 is adjustable by adjusting the adjusting element 60 such as an adjusting screw 61. In that, the top surface 10a of the housing 10 and the top surface 80a of the octagonal bolt 80 with the other winch keyhole 81 located thereat are coplanar, and the bottom surface 60b of the adjusting element 60 is attached to the bottom surface 80b of the other winch keyhole 81. In other words, the entire height H2 of the security-locking assembly 2 is the same as the depth D2 of the other winch keyhole 81. It ensures that the winch keyhole 81 is completely free of being exposed, and the safety protection of the winch keyhole 81 is achieved. Certainly, the present disclosure is not limited thereto and not redundantly described herein.

In summary, the present disclosure provides a security-locking device for a winch keyhole. The housing of the security-locking device is corresponding to the opening of the winch keyhole. When the housing of the security-locking device is inserted into the winch keyhole, the elastic portion of the elastic component exposed outside the housing is abutted against the lateral wall of the winch keyhole, so that the security-locking device is locked in the winch keyhole. Moreover, the winch keyhole is not exposed to avoid damage to the winch keyhole, so as to protect the safety of the winch keyhole. For example, the security-locking device of the present disclosure can protect a winch keyhole of an octagonal-keyhole bolt applied to the sailing vessel effectively. Whereby, it prevents the winch keyhole from being improperly operated by personnel and then failing to dismantle the bolt. On the other hand, the user can use an operation key to engage with an engagement aperture of the housing, and use the operation key to drive the security-locking device to separate from the winch keyhole, so that the elastic portion is released to pass through and be exposed outside the housing, and then the winch keyhole is exposed. In that, a specific wrench can be used to engage with the winch keyhole, so as to perform the operations such as turning the winch keyhole of the bolt. The overall structure is simplified, the size is small, and the operations are easy. Moreover, it provides the safety protection for the winch keyhole and prevents the winch keyhole from being completely exposed. In addition, the housing of the security-locking device is corresponding to the opening of the winch keyhole. When the housing of the security-locking device is inserted into the winch keyhole, the elastic portion of the elastic component exposed outside the housing is abutted against the lateral wall of the winch keyhole, so that the security-locking device is locked in the winch keyhole. Moreover, with an adjusting element such as an adjusting screw, the distance between the bottom surface of the winch keyhole and the top surface of the housing are adjustable thereby, so that the top surface of the housing and top of the winch keyhole can be coplanar. It ensures that the winch keyhole is completely free of being exposed. The protection effect for the winch keyhole is achieved. The security-locking device is further formed as a symmetrical structure. A plurality of elastic components are arranged around the outer peripheral edge of the housing at an equal distance. Moreover, the plurality of elastic components are corresponding to and pass through a plurality of notches, so as to be exposed outside the housing. For example, the housing and the winch keyhole are a symmetrical octagonal-star shape, and the plurality of notches are located at the equidistant convex corners of the octagonal-star shape, respectively. It facilitates the security-locking device to provide a stable engagement force when the security-locking device is inserted into the winch keyhole. Whereby, it prevents the security-locking device from detaching from the winch keyhole, and it ensures that the winch keyhole is not exposed.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A security-locking device for a winch keyhole, wherein the winch keyhole comprises at least one lateral wall and the security-locking device comprises:
   a housing spatially corresponding to the winch keyhole and comprising an accommodation space, a top surface, a bottom surface, an engagement aperture and at least one notch, wherein the engagement aperture is embedded in the top surface, the engagement aperture is in communication with the accommodation space, the accommodation space passes through the bottom surface, and the at least one notch is disposed between the top surface and the bottom surface and in communication with the accommodation space,
   a main body accommodated within the accommodation space and comprising at least one receiving seat spatially corresponding to the at least one notch of the housing; and
   at least one elastic component sandwiched between the housing and the main body, and comprising a fixed portion and an elastic portion, wherein the fixed portion of the at least one elastic component is correspondingly received in the at least one receiving seat, the elastic portion protrudes out of the housing through the at least one notch corresponding thereto;
   wherein when the housing is placed in the winch keyhole, the elastic portion of the at least one elastic component abuts against the at least one lateral wall of the winch keyhole, and the elastic portion is retracted to the at least one notch, so that the security-locking device is engaged within the winch keyhole, and the winch keyhole is not exposed, wherein when the engagement aperture of the housing is engaged with an operation key, and the security-locking device is driven by the operation key to separate from the winch keyhole, the elastic portion of the at least one elastic component is separated from the at least one lateral wall, so that the winch keyhole is exposed, wherein the security-locking device further comprises an adjusting element passing through and disposed in the main body, and configured to adjust a distance between a bottom surface of the adjusting element and the top surface of the housing, wherein the main body comprises a threaded hole passing through the main body, the adjusting element is an adjusting screw configured to match with the threaded hole.

2. The security-locking device according to claim 1, wherein the top surface of the housing and an opening of the winch keyhole have a similar contour shape.

3. The security-locking device according to claim 2, wherein the top surface of the housing and the opening of the winch keyhole are an octagonal-star shape, wherein the at least one notch is located at a convex corner of the octagonal-star shape.

4. The security-locking device according to claim 2, wherein the housing is formed as a symmetrical structure, the at least one notch comprises a plurality of notches, and the at least one elastic component comprises a plurality of elastic components, wherein the plurality of notches are corresponding to the plurality of elastic components, and arranged around an outer peripheral edge of the housing at an equal distance.

5. The security-locking device according to claim 1, further comprising at least one connection component connected between the main body and the housing, and configured to mount the main body in the accommodation space of the housing, wherein the housing comprises a first connection opening, the main body comprises a second connection opening, the first connection opening and the second connection opening spatially correspond to and communicate with each other, and the at least one connection component passes through the first connection opening and the second connection opening to mount the main body in the accommodation space of the housing.

6. The security-locking device according to claim 1, wherein the housing comprises an opening disposed on the top surface, and the opening of the housing is in communication with the accommodation space through the engagement aperture, wherein the housing further comprises a convex portion located in the opening of the housing, wherein the engagement aperture is disposed around an outer peripheral edge of the convex portion.

7. The security-locking device according to claim 6, wherein the main body comprises a hollow portion arranged at a center of the main body, and the hollow portion is in communication with the engagement aperture and the opening of the housing, wherein when an engagement portion of the operation key passes through the opening and the engagement aperture, the engagement portion is received within the hollow portion.

8. The security-locking device according to claim 1, wherein the adjusting element comprises a recessed hole disposed on the bottom surface of the adjusting element and configured to be driven by a tool, so as to adjust the distance between the bottom surface of the adjustment element and the top surface of the housing.

9. A security-locking device for a winch keyhole, wherein the winch keyhole comprises at least one lateral wall and the security-locking device comprises:
   a housing spatially corresponding to the winch keyhole and comprising an accommodation space, a top surface, a bottom surface, an engagement aperture and at least one notch, wherein the engagement aperture is embedded in the top surface, the engagement aperture is in communication with the accommodation space, the accommodation space passes through the bottom surface, and the at least one notch is disposed between the top surface and the bottom surface and in communication with the accommodation space,
   a main body accommodated within the accommodation space and comprising at least one receiving seat spatially corresponding to the at least one notch of the housing;
   at least one elastic component sandwiched between the housing and the main body, and comprising a fixed portion and an elastic portion, wherein the fixed portion of the at least one elastic component is correspondingly received in the at least one receiving seat, and the elastic portion protrudes out of the housing through the at least one notch corresponding thereto; and
   an operation key comprising an engagement portion spatially corresponding to the engagement aperture of the housing, wherein the engagement portion is configured to engage with the engagement aperture, so that the housing is driven by the operation key, and the security-locking device is displaced relative to the winch keyhole;
   wherein when the housing is placed in the winch keyhole, the elastic portion of the at least one elastic component abuts against the at least one lateral wall of the winch keyhole, and the elastic portion is retracted to the at least one notch, so that the security-locking device is engaged within the winch keyhole, and the winch keyhole is not exposed, wherein when the engagement portion of the operation key and the engagement aperture of the housing are engaged with each other, and the security-locking device is driven by the operation key to separate from the winch keyhole, the elastic portion of the at least one elastic component is separated from the at least one lateral wall, so that the winch keyhole is exposed, wherein the security-locking device further comprises an adjusting element passing through and disposed in the main body, and configured to adjust a distance between a bottom surface of the adjusting element and the top surface of the housing, wherein the main body comprises a threaded hole passing through the main body, the adjusting element is an adjusting screw configured to match with the threaded hole.

10. The security-locking device according to claim 9, wherein the top surface of the housing and an opening of the winch keyhole have a similar contour shape.

11. The security-locking device according to claim 10, wherein the top surface of the housing and the opening of the winch keyhole are an octagonal-star shape, wherein the at least one notch is located at a convex corner of the octagonal-star shape.

12. The security-locking device according to claim 10, wherein the housing is formed as a symmetrical structure, the at least one notch comprises a plurality of notches, and the at least one elastic component comprises a plurality of elastic components, wherein the plurality of notches are corresponding to the plurality of elastic components, and arranged around an outer peripheral edge of the housing at an equal distance.

13. The security-locking device according to claim 9, further comprising at least one connection component connected between the main body and the housing, and configured to mount the main body in the accommodation space of the housing, wherein the housing comprises a first connection opening, the main body comprises a second connection opening, the first connection opening and the second connection opening spatially correspond to and communicate with each other, and the at least one connection component passes through the first connection opening and the second connection opening to mount the main body in the accommodation space of the housing.

14. The security-locking device according to claim 9, wherein the housing comprises an opening disposed on the top surface, and the opening of the housing is in communication with the accommodation space through the engagement aperture, wherein the housing further comprises a convex portion located in the opening of the housing, wherein the engagement aperture is disposed around an outer peripheral edge of the convex portion.

15. The security-locking device according to claim 14, wherein the main body comprises a hollow portion arranged at a center of the main body, and the hollow portion is in communication with the engagement aperture and the opening of the housing, wherein when the engagement portion of the operation key passes through the opening and the engagement aperture, the engagement portion is received within the hollow portion.

16. The security-locking device according to claim 9, wherein the adjusting element comprises a recessed hole disposed on the bottom surface of the adjusting element and configured to be driven by a tool, so as to adjust the distance between the bottom surface of the adjustment element and the top surface of the housing.

\* \* \* \* \*